H. SCHREINER.
CAR-STARTER.
No. 177,429.
Patented May 16, 1876.
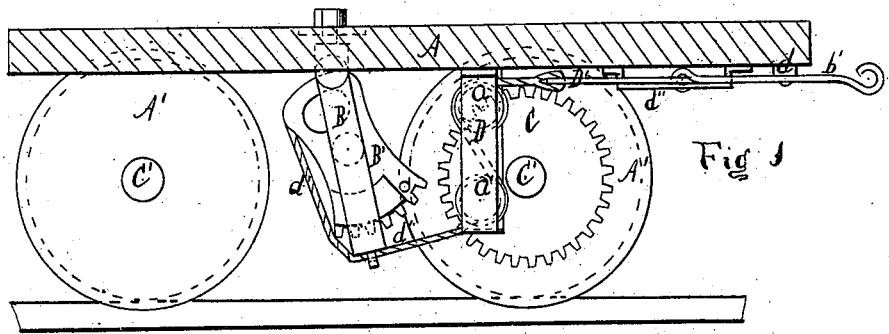
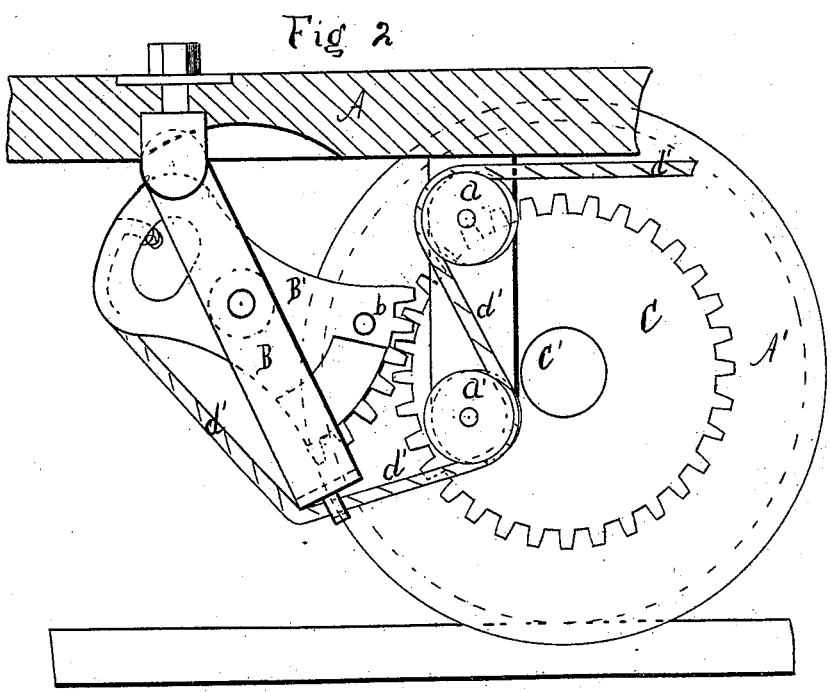

UNITED STATES PATENT OFFICE.

HENRY SCHREINER, OF PHILADELPHIA, PENNSYLVANIA.

IMPROVEMENT IN CAR-STARTERS.

Specification forming part of Letters Patent No. 177,429, dated May 16, 1876; application filed June 4, 1875.

*To all whom it may concern:*

Be it known that I, HENRY SCHREINER, of the city of Philadelphia, county of Philadelphia, and State of Pennsylvania, have invented certain new and useful Improvements in Car-Starters; and I do hereby declare the following to be a full, clear, and exact description thereof, which will enable others skilled in the art to which my invention relates to make and use the same, reference being had to the accompanying drawing, forming part of this specification, in which—

Figure 1 is a longitudinal section, showing the position of the different parts when not in motion; Fig. 2, longitudinal section, showing the position of the different parts at the time of starting.

My invention relates to what are known as "car-starters;" and consists in a toothed segment on a lever-arm, which is subjected to the action of the power applied to move the car, the lever being arranged in a swinging frame hinged to the under side of the floor, in such a manner that when the power is applied to move the car the frame moves forward with the lever far enough to allow the teeth of the same to engage the teeth of a gear-wheel secured to the axle, or to engage teeth on the inner surface of the car-wheels. The movement is obtained by means of a rope or chain secured to the outer end of the lever carrying the toothed segment, and passing through a staple or pulley on the bottom of the swinging frame, and over corresponding pulleys, and attached to the lever near the end of the car, to which lever the power is applied.

In the accompanying drawing, A represents the floor of the car, mounted upon the ordinary wheels A'. To the under side of the same is hinged the swinging frame B, to which is pivoted the lever B', carrying the toothed segment *b*. C is a gear-wheel secured to the axle C'. To the under side of the floor is also secured the frame D, for the purpose of supporting the pulleys *a* and *a'*. D', lever near the end of the car, to which the draw-bar *b'* is hinged. One end of the said lever is pivoted to the car-bottom at *d*, and to the opposite end is attached the rope or chain *d'*. *d''*, bracket secured to the under side of the floor, on which the lever D' slides and is held in position.

The operation of my invention is as follows: The power is applied to the lever D' by attaching to the draw-bar *b'*, the fulcrum of the lever being at *d*. The opposite end moves forward and brings a strain upon the rope *d'*, which brings the swinging frame B far enough forward to allow the teeth of the lever B' to engage the teeth in the wheel C. The frame then remains in that position, the strain still continuing upon the rear end of the lever B' until it has carried the wheel C far enough over to allow the teeth on the segment to pass out of gear, in which position it remains until the strain on the rope or chain is relaxed. The frame then swings back and allows the lever-teeth to pass by the teeth on the wheel C and assume the position shown in Fig. 1.

Having thus described my invention, what I claim as new, and desire to secure by Letters Patent, is—

The combination, in a car-starter, of the toothed lever B', gear-wheel C, swinging frame B, pulleys *a* and *a'*, frame D, lever D', rope or chain *d'*, bracket *d''*, and draw-bar *b'*, substantially as and for the purpose specified and described.

The above specification signed by me this 31st day of May, 1875.

HENRY SCHREINER.

Witnesses:
R. D. INGERSOLL,
T. Z. INGERSOLL.